UNITED STATES PATENT OFFICE.

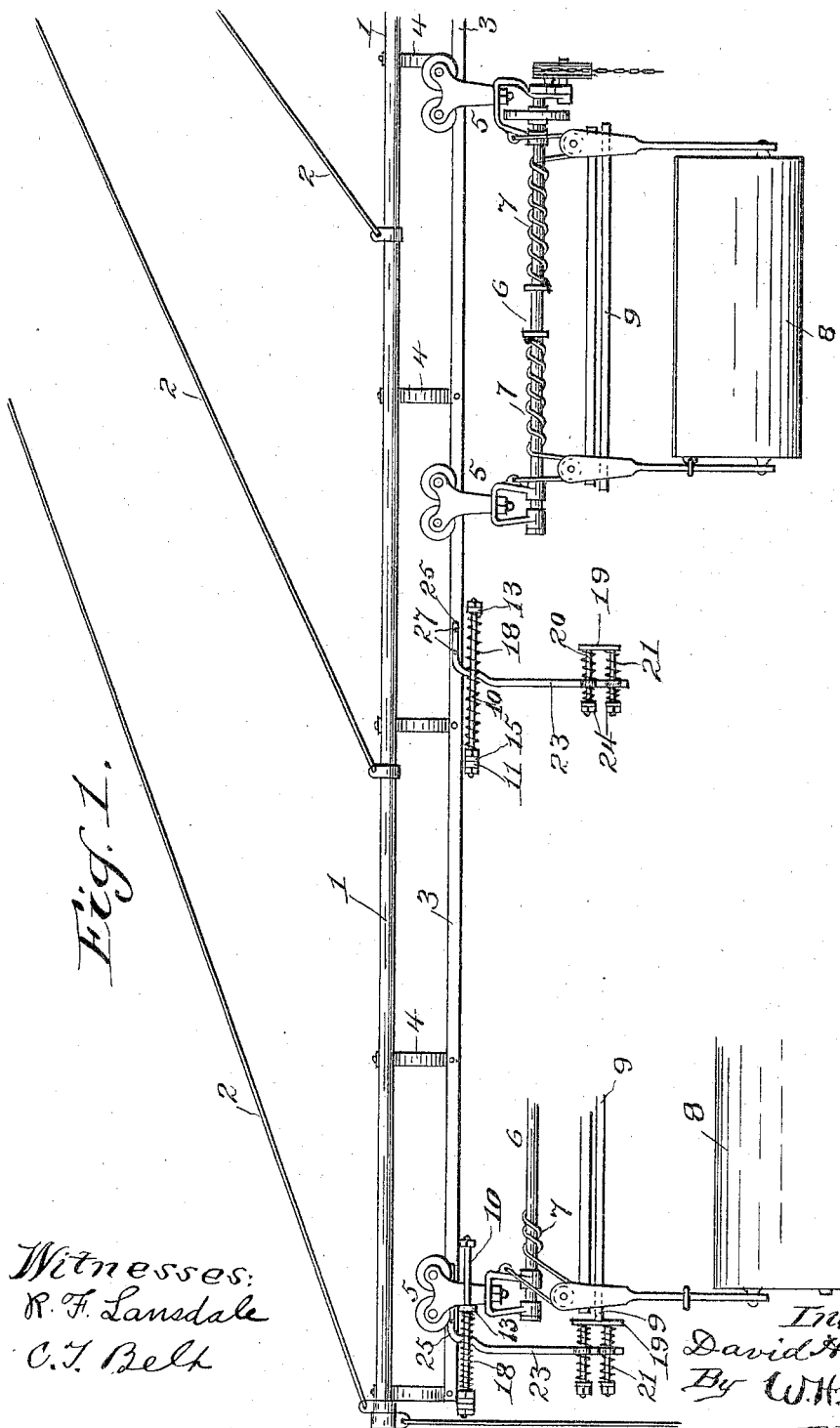

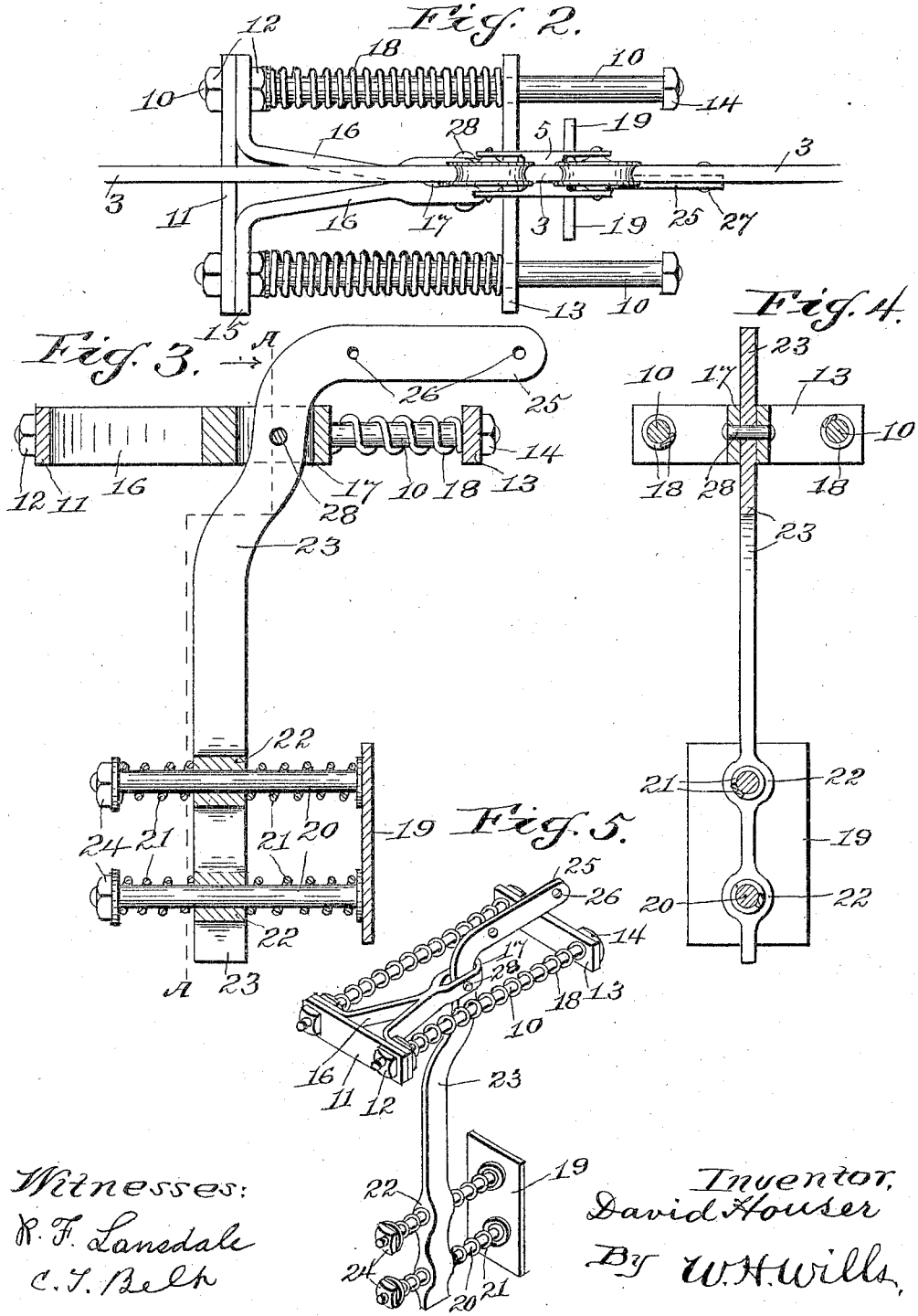

DAVID HOUSER, OF WATERTOWN, WISCONSIN.

AUTOMATIC DEVICE FOR OPERATING MANURE-CARRIERS.

1,179,923.   Specification of Letters Patent.   Patented Apr. 18, 1916.

Application filed August 19, 1915.   Serial No. 46,354.

*To all whom it may concern:*

Be it known that I, DAVID HOUSER, a citizen of the United States, residing at Watertown, in the county of Jefferson and State of Wisconsin, have invented certain new and useful Improvements in Automatic Devices for Operating Manure-Carriers, of which the following is a specification.

This invention relates to controlling devices for trolley trucks which carry loading and unloading buckets or similar load carrying receptacles such as manure carriers from a barn or stable to a predetermined point for deposit and return the receptacle for refilling.

The invention pertains especially to a device attachable at various points along the length of a trolley track for automatically stopping the load carrier, operating a load releasing device, and simultaneously giving the carrier reverse movement on the track whereby the carrier is returned for reloading.

The object of the invention is to provide a novel and peculiar attachment for trolley tracks affording a cushioned stop for the trolley truck which carries a conveyer, and for automatically operating a release mechanism for dumping the contents of the conveyer, and for automatically reversing the movement of the truck.

A further object of the invention is to provide an attachment for suspended trolley tracks, which shall automatically stop and reverse the trucks which have dumping buckets depending therefrom for carrying manure and other material from a barn or stable to various places as desired throughout the length and revolving radius of the track, and which shall automatically release the buckets for dumping simultaneously with said stop operation.

Various other objects, advantages, and improved results are attainable in the practical application of the invention hereinafter fully set forth.

In the accompanying drawings forming part of this application:—Figure 1 is an elevation showing the truck and carrier in two positions on the trolley, the latter being broken away from its swinging anchorage. Fig. 2 is a top view of the device applied to a portion of a track and showing a portion of the truck partially compressing the cushion springs. Fig. 3 is a vertical sectional view. Fig. 4 is a similar view taken on the dotted line A—A Fig. 3. Fig. 5 is a detail perspective view of the device.

The same reference characters denote the same parts throughout the several views of the drawings.

It is well known that various devices have been provided for stopping the travel of trolley trucks carrying manure buckets or conveyers, and that various devices have been provided for tripping or releasing the buckets in a dumping operation, but this invention embodies in one and the same device means for stopping the truck and giving it reverse movement, and also embodies means for automatically operating the trip or bucket release mechanism for dumping the contents of the bucket simultaneously with the stopping of the truck, whereby the usual necessity of operating the release mechanism or device by hand is avoided, and the employment of separate devices for such operation is obviated.

For the purpose of illustrating the application and operation of the invention, I employ a boom 1, pivoted to a post (not shown) adjacent to a barn or stable (not shown), and swingable laterally therefrom, and having suspending guy wires 2, for keeping the boom in horizontal position. The trolley track 3 is hung from the boom by means of hangers 4. The trolley truck 5 carries a windlass 6, having a hoisting cable 7, and means for raising and lowering a bucket 8, or other receptacle for conveying manure from a barn or stable to various places within the length and radius of the boom track. The bucket is tripped or released for dumping, by the end of the trip-operating rod 9 coming in contact with an element or member of the device forming the subject matter of this invention, and now to be particularly described.

The invention comprises a double buffer device, one of the buffers consisting of a pair of parallel rods 10 spaced apart and rigidly connected at one end by a head bar 11, secured to the rods by lock nuts 12, and a follower bar 13 slidable on the rods 10, having nuts 14, for limiting the outward movement of the bar 13. The head further comprises a V-shaped member having lateral wings 15 secured to the head bar 11 and to the rods 10, by the said lock nuts 12, and said V-shaped head member has a pair of arms 16, extending from said wings, and terminating in a loop or slot 17, preferably central of the length of the rods 10, and centrally between said rods, for the purpose hereinafter specified. The rods 10 are each provided with a spiral spring 18, compressible and expansible by the sliding movement of the follower bar 13. The other buffer comprises a tripper plate 19 having a pair of rods 20 projecting from its rear face, a pair of spiral springs 21 mounted on each rod, and the rods 20 extending through eyes 22 in a hanger 23, which separates the pair of springs of each rod so as to form a double cushion for the plate 19, and these rods are provided with suitable nuts 24.

The hanger 23 extends through the loop or slot 17 and terminates in a lateral arm 25, having bolt holes 26, for securing the arm to the track 3, as at 27. The truck buffer is suspended lengthwise the track by the arm 16 and a pin 28 extending through the loop and the hanger 23, so that this buffer may have slight oscillation relative to the track in order that the coöperation of the truck and this buffer may be perfected under various conditions or truck constructions.

It will be seen that the hanger arm 25 forms the only connection or means of attachment for the whole device comprising both buffers; that said arm may be bolted to the track at any desired point and thereby position the device as desired for stopping, tripping and reverse movement.

Obviously the pivot connection between the hanger and the truck buffer may be changed for raising and lowering this buffer as occasion may demand.

The device being attached to the track for stopping the truck and dumping the bucket at such place as desired, the bucket is loaded, at a stable or barn door and started on its course, so that when the truck reaches the device the thrust of the truck against the follower bar compresses the springs 10, and throws the end of the tripper rod 9 against the plate 19, for dumping the contents of the bucket during the compression of said springs, and the expansion of said springs is sufficient to return the truck and the bucket to their starting place.

It will be observed that the thrust of the truck against the follower bar will swing the trip rod 9 against the tripper plate with such force as to insure the operation of said rod for releasing the bucket in advance of the reverse movement of the truck.

Having thus described my invention what I claim as new and desire to secure by Letters Patent is:—

1. A trolley track attachment for stopping and reversing a trolley truck and for operating a dumping bucket trip-mechanism, comprising a hanger secured to and depending from the track, a cushioned bar suspended by the hanger under the track for engagement with the truck, means connecting said bar with the hanger, and a cushioned trip plate carried by the depending end of the hanger.

2. A trolley track buffer comprising a hanger having an arm secured to the track and a free end depending from the arm, a cross-head having pivot connection with the hanger, a cushioned bar suspended by the cross-head, and a plate cushioned on the free end of the hanger.

In witness whereof I hereunto set my hand in the presence of two witnesses.

DAVID HOUSER.

Witnesses:
Max Rohr,
Chas. E. Frey.

Copies of this patent may be obtained for five cents each, by addressing the "Commissioner of Patents, Washington, D. C."